United States Patent
Park et al.

(10) Patent No.: US 10,012,859 B2
(45) Date of Patent: Jul. 3, 2018

(54) DISPLAY DEVICE HAVING IMPROVED TRANSMITTANCE CHARACTERISTICS

(71) Applicant: SAMSUNG DISPLAY CO., LTD., Yongin-si, Gyeonggi-do (KR)

(72) Inventors: Sang Il Park, Seoul (KR); Won Tae Kim, Suwon-si (KR); Ji Yeon Choi, Yongin-si (KR); Seok-Joon Hong, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 158 days.

(21) Appl. No.: 15/070,419

(22) Filed: Mar. 15, 2016

(65) Prior Publication Data
US 2016/0313600 A1 Oct. 27, 2016

(30) Foreign Application Priority Data
Apr. 24, 2015 (KR) ........................ 10-2015-0057896

(51) Int. Cl.
| G02F 1/1333 | (2006.01) |
| G02F 1/1362 | (2006.01) |
| G02F 1/1335 | (2006.01) |
| G02F 1/1341 | (2006.01) |

(52) U.S. Cl.
CPC ...... *G02F 1/133377* (2013.01); *G02F 1/1362* (2013.01); *G02F 1/133371* (2013.01); *G02F 1/1341* (2013.01); *G02F 1/133516* (2013.01); *G02F 2001/136222* (2013.01)

(58) Field of Classification Search
CPC ......... G02F 1/133377; G02F 1/133371; G02F 1/136209; G02F 1/1362
See application file for complete search history.

(56) References Cited

U.S. PATENT DOCUMENTS

| 8,518,729 B1 * | 8/2013 | Dai | H01L 29/78633 257/E21.062 |
| 2004/0201815 A1 * | 10/2004 | Yamamoto | G02F 1/133371 349/156 |
| 2009/0256979 A1 * | 10/2009 | Shin | G02F 1/133371 349/38 |
| 2014/0347611 A1 * | 11/2014 | Kim | G02F 1/133514 349/106 |
| 2015/0077687 A1 * | 3/2015 | Chiang | G02F 1/133512 349/110 |

FOREIGN PATENT DOCUMENTS

KR  10-2014-0094217 A  7/2014

* cited by examiner

*Primary Examiner* — James Dudek
(74) *Attorney, Agent, or Firm* — Innovation Counsel LLP

(57) ABSTRACT

A display device including: a substrate including first, second, and third pixel areas; a plurality of pixel electrodes positioned on the substrate within each of the first, second, and third pixel areas; and a plurality of roof layers each facing a respective one of the pixel electrodes, ones of the roof layers positioned to be spaced apart from respective ones of the pixel electrodes with a plurality of microcavities therebetween, the microcavities positioned to correspond to each of the first, second, and third pixel areas. The roof layer includes first and second color filter layers positioned corresponding to the first pixel area and the second pixel area and a third color filter layer positioned below the liquid crystal layer, and a cell gap of the microcavity corresponding to the third pixel area is smaller than cell gaps of the microcavities corresponding to the first and second pixel areas.

20 Claims, 18 Drawing Sheets

DISPLAY DEVICE HAVING IMPROVED TRANSMITTANCE CHARACTERISTICS

CROSS-REFERENCE TO RELATED APPLICATION

This application claims priority to, and the benefit of, Korean Patent Application No. 10-2015-0057896 filed in the Korean Intellectual Property Office on Apr. 24, 2015, the entire contents of which are incorporated herein by reference.

BACKGROUND (a) Field

Embodiments of the present invention relate to flat panel displays. More specifically, embodiments of the present invention relate to displays having improved transmittance characteristics.

(b) Description of the Related Art

A liquid crystal display, which is one of the most common types of flat panel displays currently in use, includes two display panels with field generating electrodes such as a pixel electrode and a common electrode, and a liquid crystal layer interposed therebetween. The liquid crystal display generates an electric field in the liquid crystal layer by applying a voltage across the field generating electrodes to determine alignment of liquid crystal molecules of the liquid crystal layer through the generated electric field. This controls polarization of incident light, thereby displaying images.

The two display panels configuring the liquid crystal display may include a thin film transistor array panel and an opposing display panel. In the thin film transistor array panel, a gate line transferring a gate signal and a data line transferring a data signal are formed to cross each other, and a thin film transistor connected to the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display of the related art, two substrates are necessarily used, and constituent elements are formed on both substrates. This presents disadvantages in that the resulting display device is heavy and thick, has high associated cost, and has a long processing time.

Also, when the same voltage is applied for each sub pixel by varying the transmittance of light for each color filter of R, G, or B, deterioration of a contrast ratio of the entire liquid crystal display may be caused due to a difference in transmittance. As a result, in order to account for the different transmittance of each color filter, different voltages need to be applied for each color filter, and a separate voltage control unit for controlling the voltage needs to be provided.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a display device having advantages of reduced weight, thickness, cost, and processing time by manufacturing the display device with a single substrate.

Further, embodiments of the present invention provide a display device capable of correcting a difference in transmittance of color filters without a separate additional process or voltage control unit, by forming a different microcavity thickness for each pixel without adding a separate mask, through a position change of the color filter.

An exemplary embodiment of the present invention provides a display device including: a substrate including a first pixel area, a second pixel area, and a third pixel area; a plurality of pixel electrodes positioned on the substrate within each of the first, second, and third pixel areas; a plurality of roof layers each facing a respective one of the pixel electrodes, ones of the roof layers positioned to be spaced apart from respective ones of the pixel electrodes with a plurality of microcavities therebetween, the microcavities positioned to correspond to each of the first, second, and third pixel areas; and a liquid crystal layer having liquid crystal material positioned in the microcavities. The roof layer includes a first color filter layer and a second color filter layer positioned to correspond to the first pixel area and the second pixel area, and further includes a third color filter layer positioned below the liquid crystal layer. A cell gap of the microcavity corresponding to the third pixel area is smaller than cell gaps of the microcavities respectively corresponding to the first pixel area and the second pixel area.

The third pixel area may be a blue pixel area, and the third color filter may be a blue color filter.

The first pixel area may be a red pixel area, and the first color filter may be a red color filter, and the second pixel area may be a green pixel area, and the second color filter may be a green color filter.

The display device may further include a common electrode formed on one of the microcavities to face the pixel electrode.

A lower insulating layer and an upper insulating layer may be formed on the common electrode in the third pixel area.

A partition wall portion may be positioned between two adjacent microcavities, and the partition wall portion may include the common electrode, the lower insulating layer, the first color filter or the third color filter, and the upper insulating layer.

The display device may further include a capping layer formed on the first color filter layer, the second color filter layer, and the upper insulating layer. A trench may be formed between adjacent microcavities, and the capping layer may cover the trench.

The trench may extend substantially parallel to a gate line.

The third pixel area may be a red pixel area, and the third color filter may be a red color filter.

The third pixel area may be a green pixel area, and the third color filter may be a green color filter.

Another exemplary embodiment of the present invention provides a display device including: a substrate including a first pixel area, a second pixel area, and a third pixel area; a plurality of pixel electrodes positioned on the substrate within each of the first, second, and third pixel areas a plurality of roof layers each facing a respective one of the pixel electrodes, ones of the roof layers positioned to be spaced apart from respective ones of the pixel electrodes with a plurality of microcavities therebetween, the microcavities positioned to correspond to each of the first, second, and third pixel areas; and a liquid crystal layer having liquid crystal material positioned in the microcavities. The roof layer includes a first color filter layer positioned at a portion corresponding to the first pixel area, and a second color filter layer and a third color filter layer each positioned below the liquid crystal layer.

Cell gaps of the microcavities corresponding to the second pixel area and the third pixel area may be smaller than a cell gap of the microcavity corresponding to the first pixel area.

The first color filter, the second color filter, and the third color filter may have colors respectively selected from red, blue, and green.

Yet another exemplary embodiment of the present invention provides a method of manufacturing a display device, comprising: forming a first color filter on a substrate; forming a first pixel electrode on the first color filter, and forming second and third pixel electrodes on the substrate and spaced apart from the first color filter; coating and patterning a sacrificial layer on each of the pixel electrodes; forming a second color filter and a third color filter on the sacrificial layer and on the second and third pixel electrodes, respectively; forming a plurality of microcavities with liquid crystal injection holes by removing the sacrificial layer, the plurality of microcavities including a first microcavity over the first color filter, and second and third microcavities under the second and third color filters, respectively; injecting an alignment material into the plurality of microcavities; and injecting a liquid crystal material into the plurality of microcavities. A cell gap of the first microcavity is smaller than a cell gap of the second microcavity and is smaller than a cell gap of the third microcavity.

The first color filter may be a blue color filter, the second color filter may be a green color filter, and the third color filter may be a red color filter.

The method may further include forming a light blocking member between adjacent ones of the color filters.

The method may further include, after the forming a first color filter and before the forming a second color filter and a third color filter, forming an interlayer insulating layer on the first color filter, wherein a height of the interlayer insulating layer over the first color filter is different from a height of portions of the interlayer insulating layer spaced apart from the first color filter.

After the coating and patterning, a thickness of the sacrificial layer over the first color filter may be smaller than a thickness of remaining parts of the sacrificial layer.

The method may further include, prior to the forming a second color filter and a third color filter, forming a common electrode and a lower insulating layer on the sacrificial layer.

The method may further include forming a capping layer on the second color filter layer and third color filter layer to cover the corresponding liquid crystal injection holes.

According to the exemplary embodiment of the present invention, it is possible to achieve a differing thickness of each microcavity for each pixel, and to correct a difference in transmittance for each color of color filters, without adding a separate mask. This is accomplished through a position change of the color filter.

BRIEF DESCRIPTION OF THE DRAWINGS

FIGS. 5 to 10 and 12 illustrate the same cross section as FIG. 4, and FIGS. 11 and 13 illustrate the same cross section as FIG. 2.

DETAILED DESCRIPTION OF THE EMBODIMENTS

Figure 1:
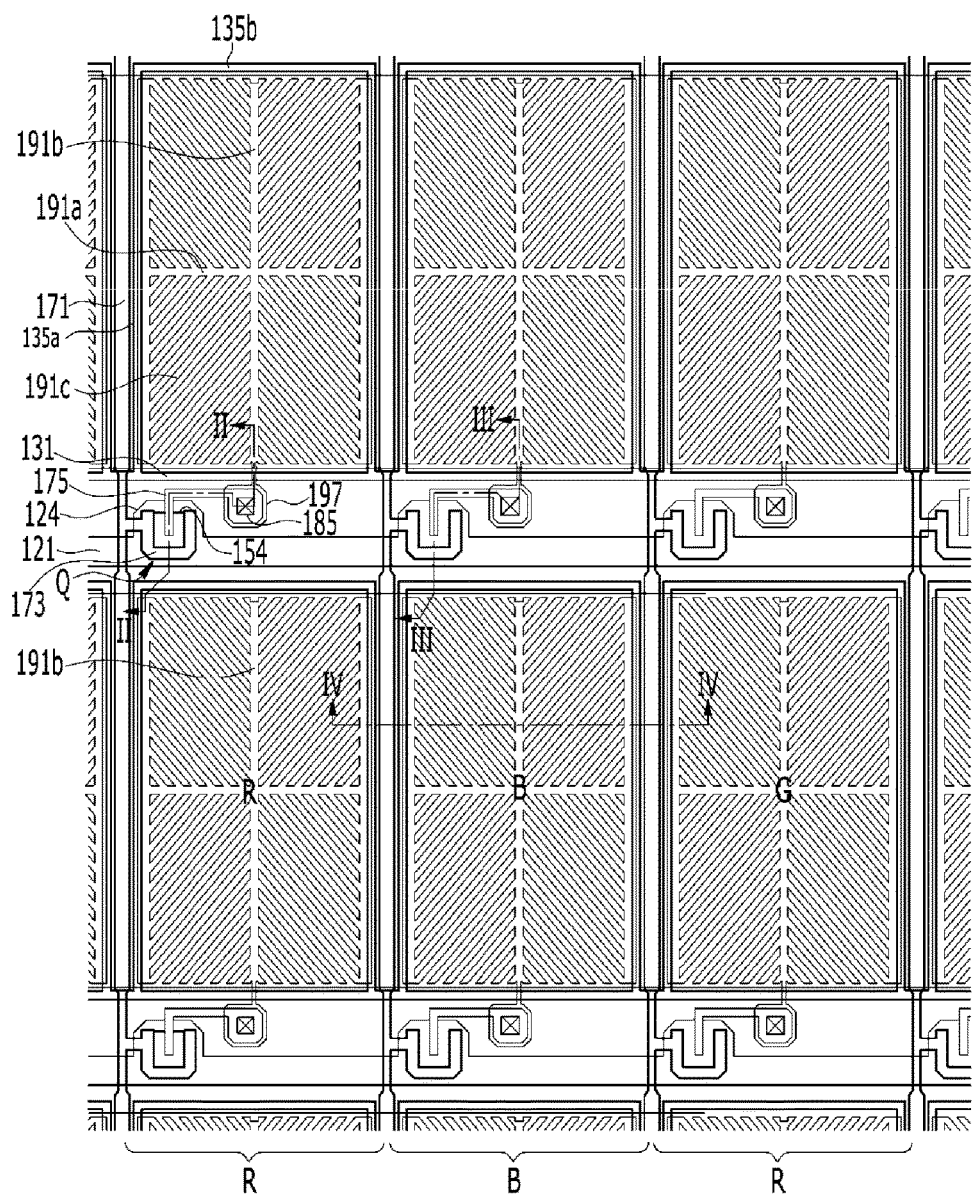
FIG. 1 is a plan view illustrating a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. The various Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

All numerical values are approximate, and may vary. All examples of specific materials and compositions are to be taken as nonlimiting and exemplary only. Other suitable materials and compositions may be used instead.

Hereinafter, a display device and a manufacturing method thereof according to an exemplary embodiment of the present invention will be described in detail with reference to the accompanying drawings.

Figure 2:
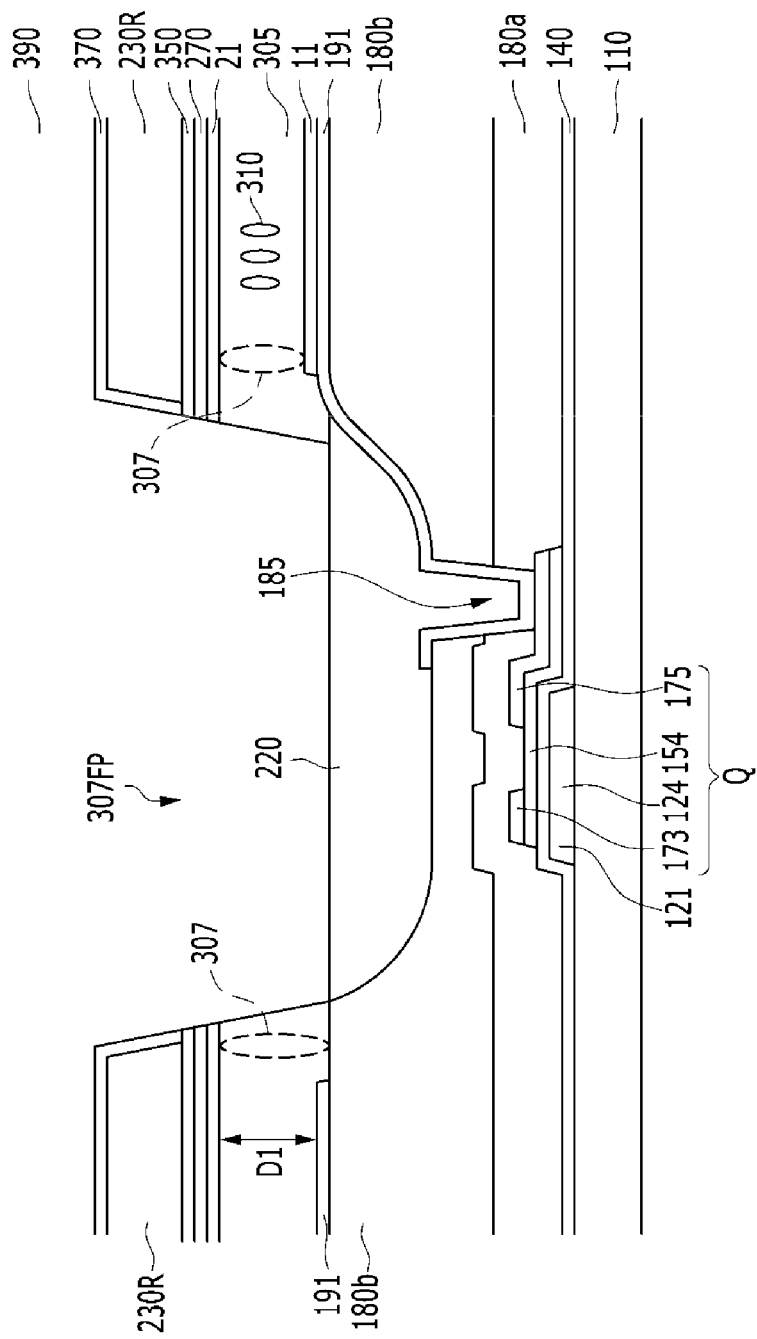
FIG. 2 is a cross-sectional view taken along line II-II of FIG. 1.
Figure 3:
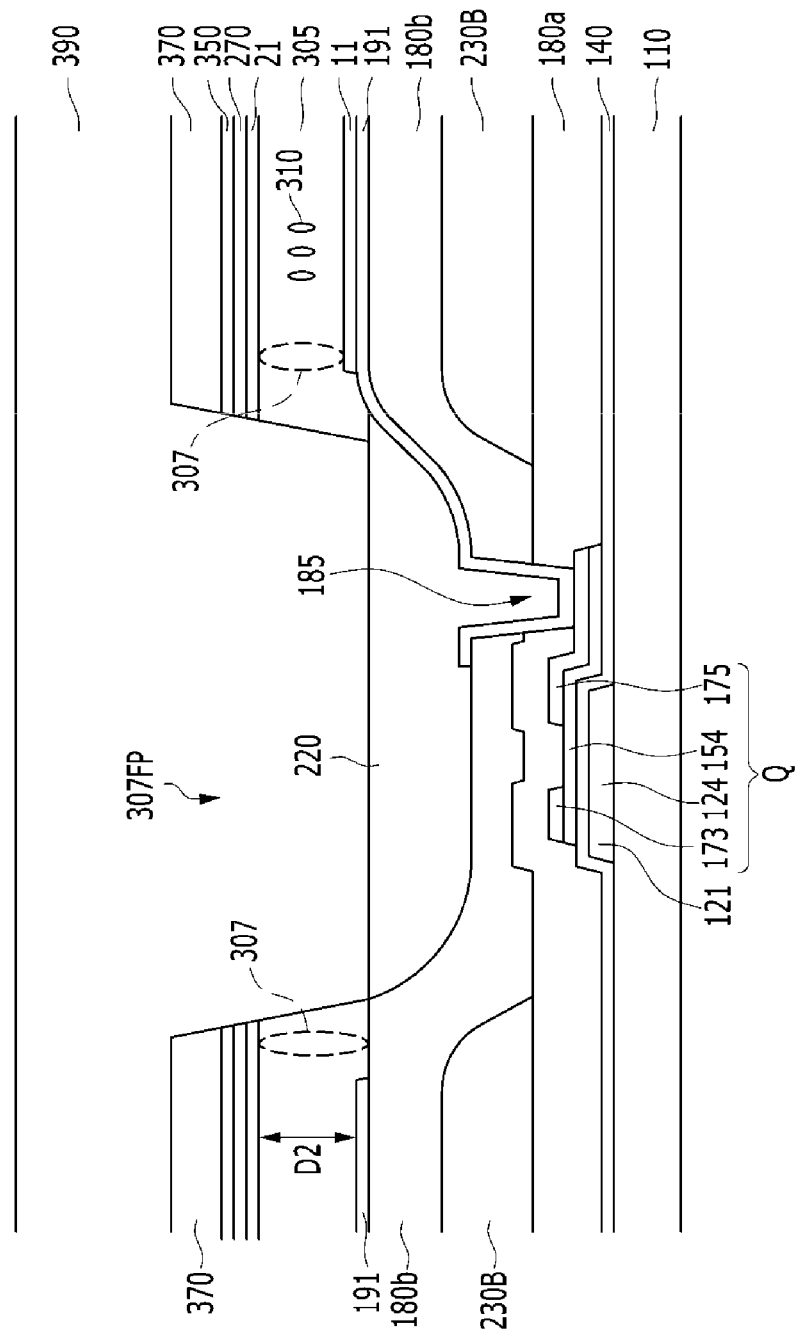
FIG. 3 is a cross-sectional view taken along line of FIG. 1.
Figure 4:
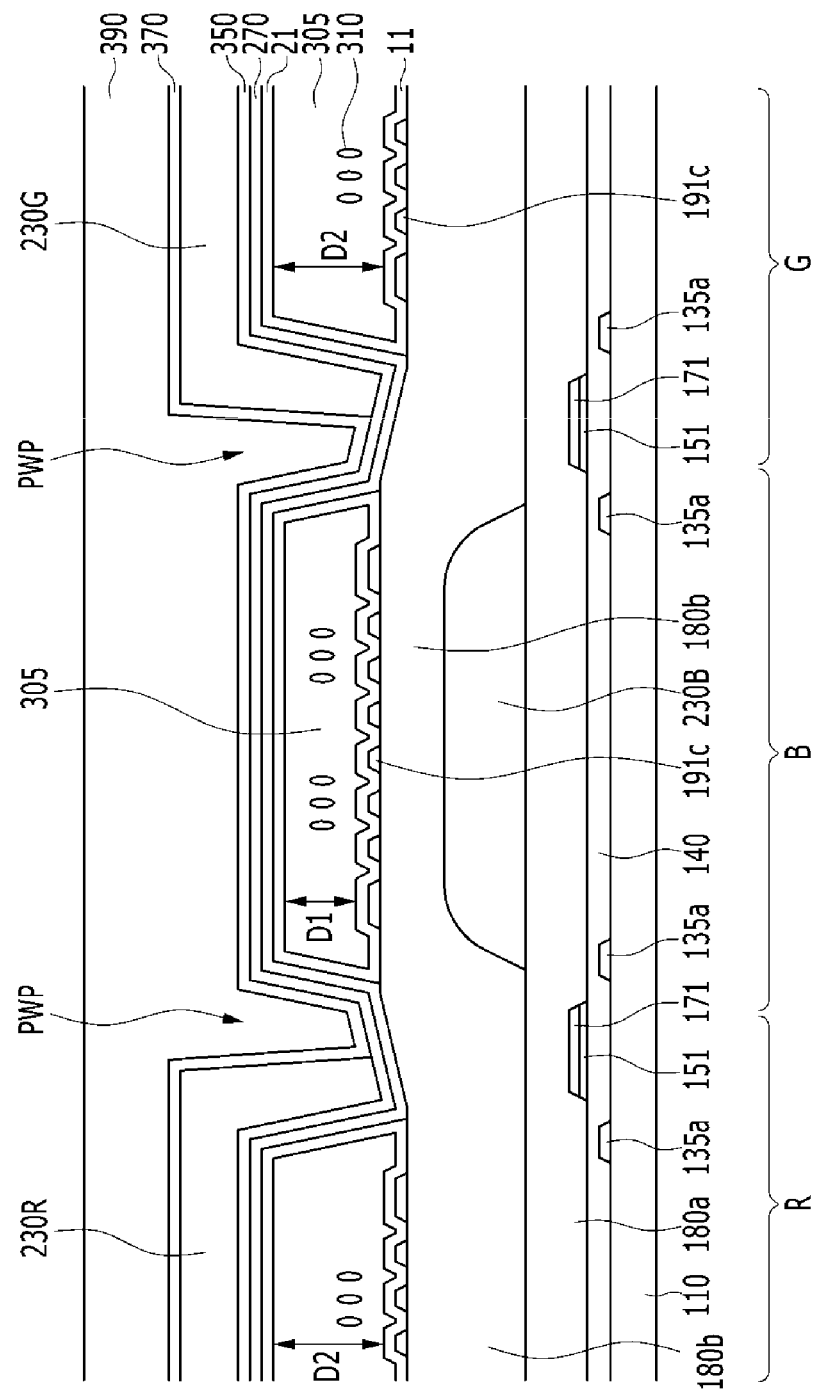
FIG. 4 is a cross-sectional view taken along line IV-IV of FIG. 1.

FIG. 1 is a plan view illustrating a liquid crystal display according to an exemplary embodiment of the present invention. FIG. 2 is a cross-sectional view taken along line II-II of FIG. 1. FIG. 3 is a cross-sectional view taken along line of FIG. 1. FIG. 4 is a cross-sectional view taken along line IV-IV of FIG. 1.

Referring to FIG. 1, in a display device according to an exemplary embodiment of the present invention, pixels representing red, blue, and green are alternately formed to be adjacent to each other. FIG. 2 illustrates a cross section of a red pixel (alternatively, a green pixel), and FIG. 3 illustrates a cross section of a blue pixel.

Referring to FIGS. 1 to 4, a gate line 121 and a storage electrode line 131 are formed on a substrate 110 made of transparent glass, plastic, or the like. The gate line 121 includes a gate electrode 124. The storage electrode line 131 mainly extends in a horizontal direction and transfers a predetermined voltage such as a common voltage Vcom. The storage electrode line 131 includes a pair of vertical portions 135a extending to be substantially oriented in a vertical direction, i.e. perpendicular to the gate line 121, and a horizontal portion 135b connecting ends of the pair of vertical portions 135a to each other. The storage electrodes 135a and 135b have a structure surrounding a pixel electrode 191.

A gate insulating layer 140 is formed on the gate line 121 and the storage electrode line 131. On the gate insulating layer 140 are formed a semiconductor layer 151 positioned below a data line 171, and a semiconductor layer 154 positioned below source/drain electrodes 173/175 and at a channel portion of a thin film transistor Q.

A plurality of ohmic contacts may be formed on the respective semiconductor layers 151 and 154 and between the data line 171 and the source/drain electrodes 173/175, and is omitted in the drawing.

Data conductors 171, 173, and 175 including a source electrode 173, a data line 171 connected to the source electrode 173, and a drain electrode 175 are formed on the respective semiconductor layers 151 and 154 and the gate insulating layer 140.

The gate electrode 124, the source electrode 173, and the drain electrode 175 form a thin film transistor Q together with the semiconductor layer 154, and a channel of the thin film transistor Q is formed in the semiconductor layer 154 between the source electrode 173 and the drain electrode 175.

A first interlayer insulating layer 180a is formed on the data conductors 171, 173, and 175, and an exposed portion of the semiconductor layer 154. The first interlayer insulating layer 180a may be made of an inorganic insulating material such as silicon nitride (SiNx) and silicon oxide (SiOx), or an organic insulating material.

Next, referring to FIGS. 1 and 3, a blue color filter 230B is formed on the first interlayer insulating layer 180a.

However, the color filter 230B is formed only in a blue pixel area. That is, the blue color filter 230B is formed in only one pixel area from among three adjacent pixels.

As illustrated in FIG. 3, the blue color filter 230B is not formed in an injection hole formation region 307FP (which also covers a thin film transistor and the like), but is formed only in each pixel area.

Next, a second interlayer insulating layer 180b is formed on the blue color filter 230B. In this case, the second interlayer insulating layer 180b is formed in or over all of the pixels, including each of the red, blue, and green pixels.

Next, the pixel electrode 191 is formed on the second interlayer insulating layer 180b.

The pixel electrode 191 has an overall shape of a quadrangle and includes a cross stem that includes a horizontal stem 191a and a vertical stem 191b crossing the horizontal stem 191a. Further, the pixel electrode 191 is divided into four domains by the horizontal stem 191a and the vertical stem 191b, and each domain includes a plurality of minute branches 191c. Further, in the exemplary embodiment, the pixel electrode 191 may further include an outer stem surrounding an outer side of the pixel electrode 191.

The minute branches 191c of the pixel electrode 191 form an angle of approximately 40° to 45° with their adjacent gate line 121 or horizontal stem. Further, the minute branches of two adjacent domains may be perpendicular to each other. Further, a width of the minute branch may gradually increase with distance from the cross stem, or distances between the minute branches 191c may be different from each other.

The pixel electrode 191 includes an extension 197 which is connected to a lower end of the vertical stem 191b and has a larger area than the vertical stem 191b, and is physically and electrically connected with the drain electrode 175 through the contact hole 185 to receive a data voltage from the drain electrode 175.

The description of the thin film transistor Q and the pixel electrode 191 described above are nonlimiting examples only. For example, a structure of the thin film transistor and a design of the pixel electrode may be modified in order to improve side visibility.

A light blocking member 220 is formed on a part of the pixel electrode 191 and the second interlayer insulating layer 180b. The light blocking member is formed of a material through which light does not pass. In the exemplary embodiment, the light blocking member is formed in a horizontal direction to extend parallel with the gate line 121. As illustrated in FIGS. 2 and 3, the light blocking member 220 is formed parallel direction the gate line along the injection hole formation region 307FP.

In the case of the blue pixel, the light blocking member 220 is formed in the region where the blue color filter 230B is not formed.

In the present exemplary embodiment, the data line 171 serves as the light blocking member and thus a separate vertical light blocking member is not formed, but in another exemplary embodiment, a vertical light blocking member formed to extend parallel with the data line may be further included.

In FIGS. 2 and 3, it is illustrated that an upper surface after the light blocking member is formed is flat, but actually, in the exemplary embodiment, the upper surface is not flat but may have a slight step due to a thickness of the second interlayer insulating layer 180b and a thickness of the light blocking member.

A lower alignment layer 11 is formed on the pixel electrode 191, and may be a vertical alignment layer. The lower alignment layer 11 may include at least one of any materials generally used as a liquid crystal alignment layer, such as polyamic acid, polysiloxane, polyimide, or the like.

An upper alignment layer 21 is positioned above and facing the lower alignment layer 11, and a microcavity 305 is formed between the lower alignment layer 11 and the upper alignment layer 21. A liquid crystal material including liquid crystal molecules 310 is injected in the microcavity 305, and the microcavity 305 has an inlet 307. The microcavity 305 may be formed in a column direction, that is, a vertical direction in the view of FIG. 1. In the exemplary embodiment, the alignment material forming the alignment layers 11 and 21 and the liquid crystal material including the liquid crystal molecules 310 may be injected into the microcavity 305 by using capillary force.

In this case, referring to FIG. 4, a size of the microcavity 305 varies for each pixel. That is, as illustrated in FIG. 4, a cell gap D1 of the microcavity 305 in the blue pixel area where the blue color filter 230B is formed below is smaller than a cell gap D2 of the microcavity 305 in a red pixel or a green pixel where the color filter is not formed below.

As illustrated in FIG. 4, the reason is that the blue color filter 230B is formed below the microcavity 305 in the blue pixel area, but the color filter is formed on the microcavity 305 in the red pixel and the green pixel.

In the display device according to the exemplary embodiment of the present invention, heights of the microcavities 305 in the red, green, blue pixel areas are different from each other.

Generally, color filters of three primary colors such as red, green, and blue have different light transmittance for each color filter. Accordingly, when the microcavities 305 are formed with the same widths, a contrast ratio may deteriorate due to a transmittance difference.

Particularly, in the case of the blue color filter, since the transmittance of blue is significantly different from that of other colors, it is important to control the width of the microcavity 305 to be different from other colors.

As a result, conventionally, in order to achieve different transmittance for each color filter 230 and prevent deterioration of the contrast ratio, a voltage is differently controlled and supplied for each color filter 230. To this end, a separate voltage control unit for controlling a voltage supplied to each color filter 230 needs to be formed.

However, in the display device according to the exemplary embodiment of the present invention, a blue color filter is positioned below the microcavity 305 only in the blue pixel area, and as a result, the width of the microcavity 305 may be varied without adding a separate process, and a difference in transmittance of light in each color filter may be corrected without a separate voltage control unit.

The microcavity 305 is divided in a vertical direction by a plurality of trenches 307FP positioned at the portion overlapping the gate line 121, and further, a plurality of microcavities 305 is formed to extend parallel to the gate line 121. Each of the plurality of microcavities 305 may correspond to one pixel area or two or more pixel areas.

A common electrode 270 and a lower insulating layer 350 are positioned on the upper alignment layer 21. The common electrode 270 receives a common voltage and generates an electric field together with the pixel electrode 191 to which a data voltage is applied, to determine tilt directions of the liquid crystal molecules 310 positioned in the microcavity 305 between the two electrodes 191, 270. The common electrode 270 forms a capacitor together with the pixel electrode 191 to maintain the applied voltage even after the thin film transistor is turned off. The lower insulating layer 350 may be formed of silicon nitride ($SiN_x$) or silicon oxide ($SiO_2$).

In the exemplary embodiment, the common electrode 270 is formed on the microcavity 305, but in other exemplary embodiments, the common electrode 270 may be formed below the microcavity 305 and thus the liquid crystal may be driven according to an in-plane switching mode.

Referring to FIGS. 1, 2, and 4, a red color filter 230R and a green color filter 230G are positioned on the lower insulating layer 350. However, a blue color filter is not formed on the lower insulating layer 350 in the blue pixel area. That is, the red color filter 230R is formed only on the red pixel area, and the green color filter 230G is formed only on the green pixel area.

The red color filter 230R and the green color filter 230G serve as a roof layer so that the shape of the microcavity 305, which is a space between the pixel electrode 191 and the common electrode 270, may be maintained. In this case, parts of the red color filter 230R and the green color filter 230G fill spaces between the adjacent pixel areas to form a partition wall portion PWP.

An upper insulating layer 370 is positioned on the red color filter 230R of the red pixel, the green color filter of the green pixel, and the lower insulating layer 350 of the blue pixel. The upper insulating layer 370 may contact the red color filter 230R, the green color filter 230G, and an upper surface of the lower insulating layer 350. The upper insulating layer 370 may be formed of silicon nitride ($SiN_x$) or silicon oxide ($SiO_2$).

A capping layer 390 covers an inlet 307 of the microcavity 305 exposed by the trench 307FP, while also filling the trench 307FP. The capping layer 390 includes an organic material or an inorganic material.

In the exemplary embodiment, as illustrated in FIG. 4, the partition wall portion PWP is formed between microcavities 305 adjacent to each other in a horizontal direction. The partition wall portion PWP may be formed by filling a space between the microcavities 305 adjacent to each other in a horizontal direction. The lower insulating layer 350, the common electrode 270, and the upper insulating layer 370 may together make up the partition wall portion PWP. The partition wall portion PWP may partition or define the microcavity 305. In the exemplary embodiment, since a partition wall structure such as the partition wall portion PWP exists between the microcavities 305, even though the insulation substrate 110 is bent, generated stress is small, and the amount by which a cell gap is altered may be significantly reduced.

As such, in the display device according to the exemplary embodiment of the present invention, the blue color filter is formed below the microcavity, and the red color filter and the green color filter are formed on the microcavity to serve as a roof layer.

Accordingly, the cell gap of the microcavity in the blue pixel area may be lowered, and the contrast ratio may be prevented from deteriorating due to a difference in color filter transmittance.

Further, since the red color filter, the green color filter, the lower insulating layer, and the upper insulating layer serve as the roof layer, forming a separate roof layer may be omitted.

Further, the blue color filter is formed before the microcavity is formed, so as to naturally induce a difference in size of the microcavities during display panel fabrication, and as a result, a separate process is not required to form the difference between the microcavities.

Next, hereinafter, a method of manufacturing a display device according to another exemplary embodiment of the present invention will be described with reference to FIGS. 5 to 13.

Figure 9:
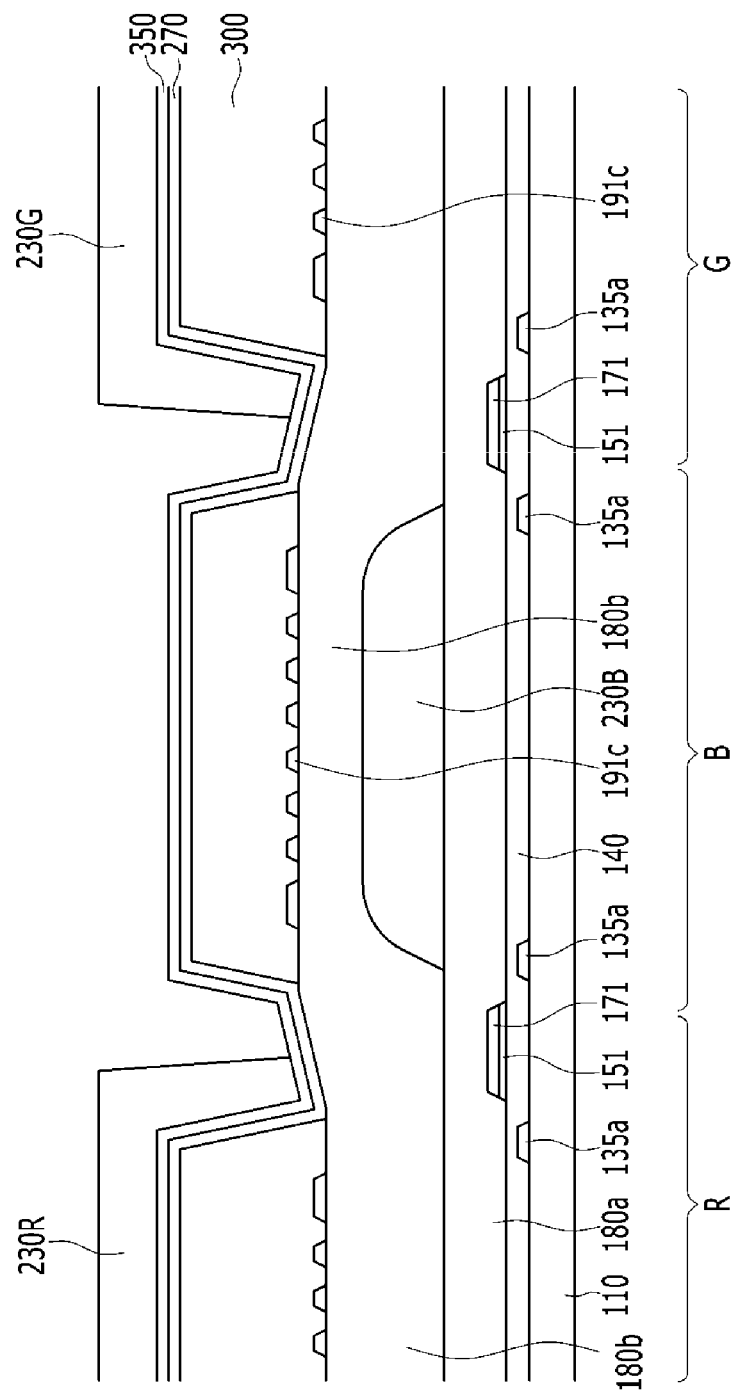
Figure 10:
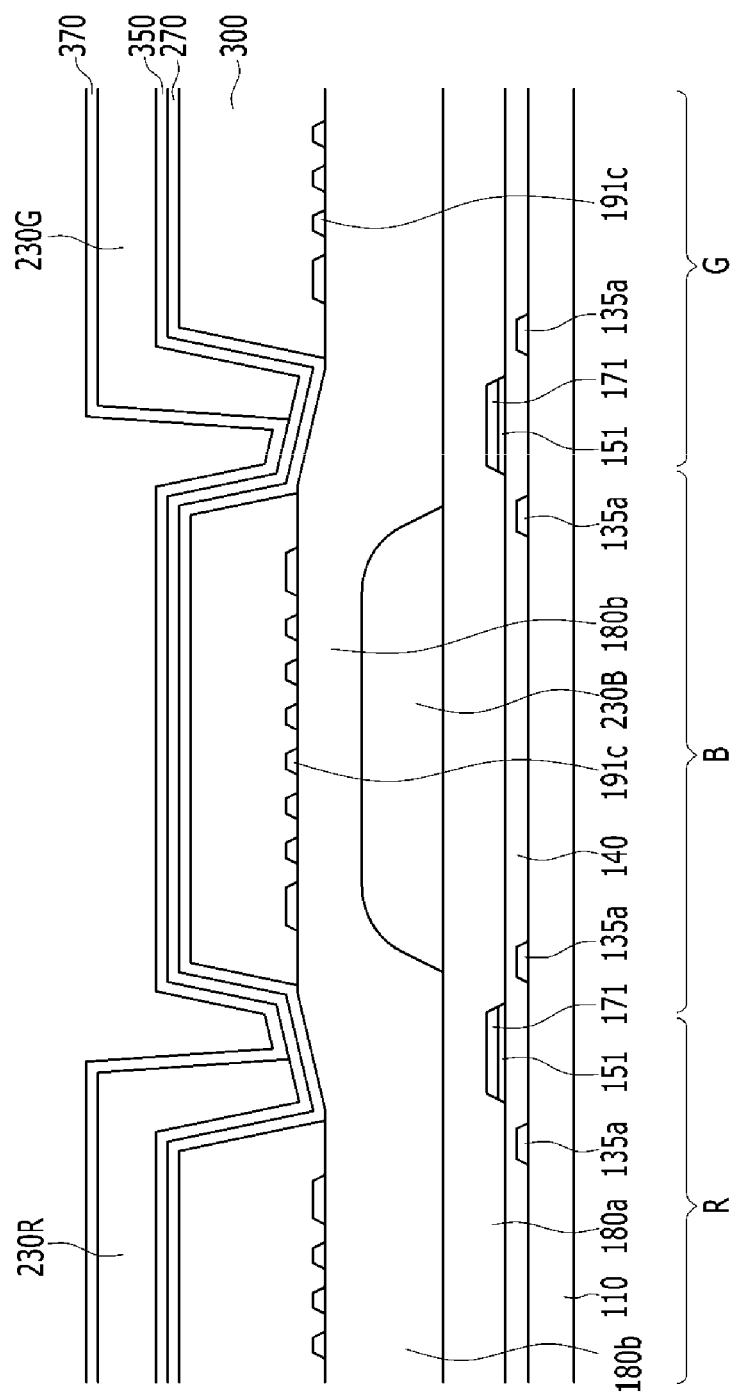
Figure 11:
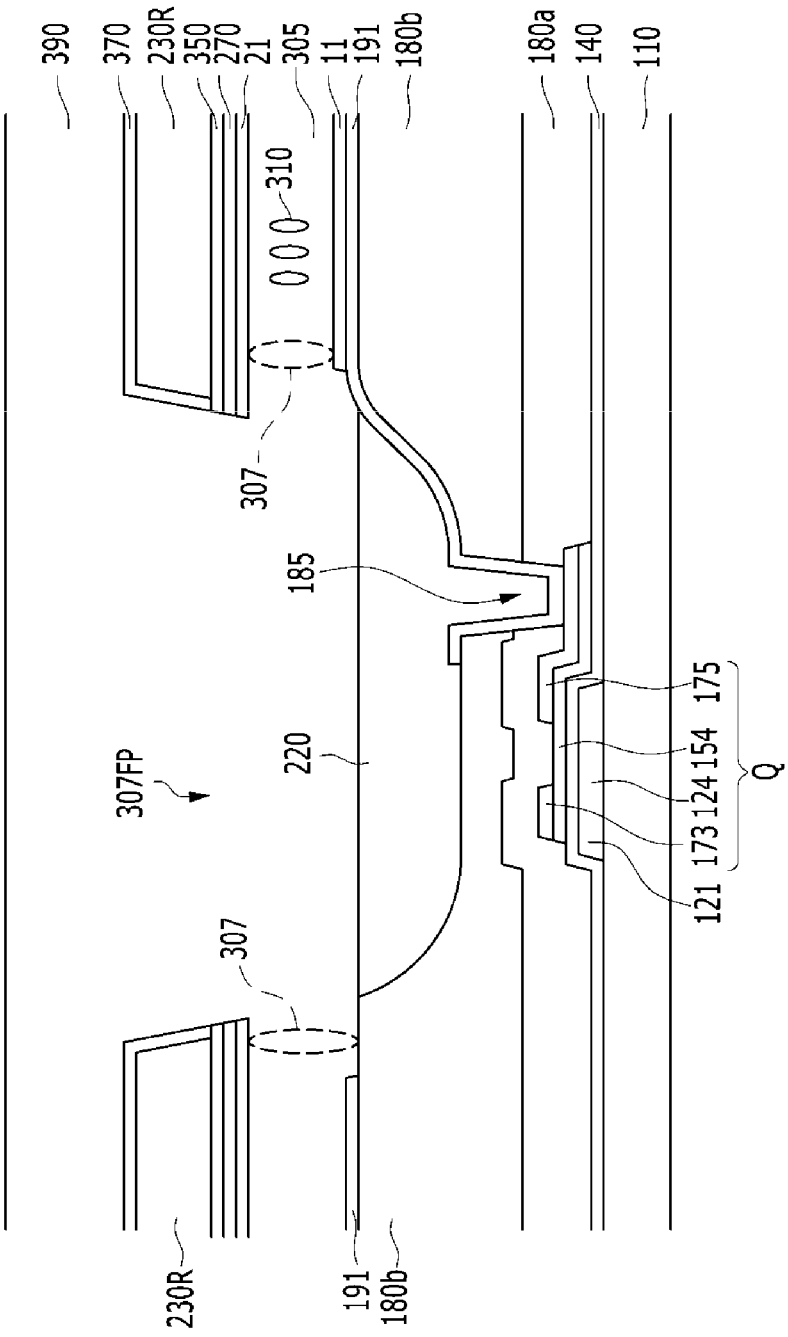
Figure 12:
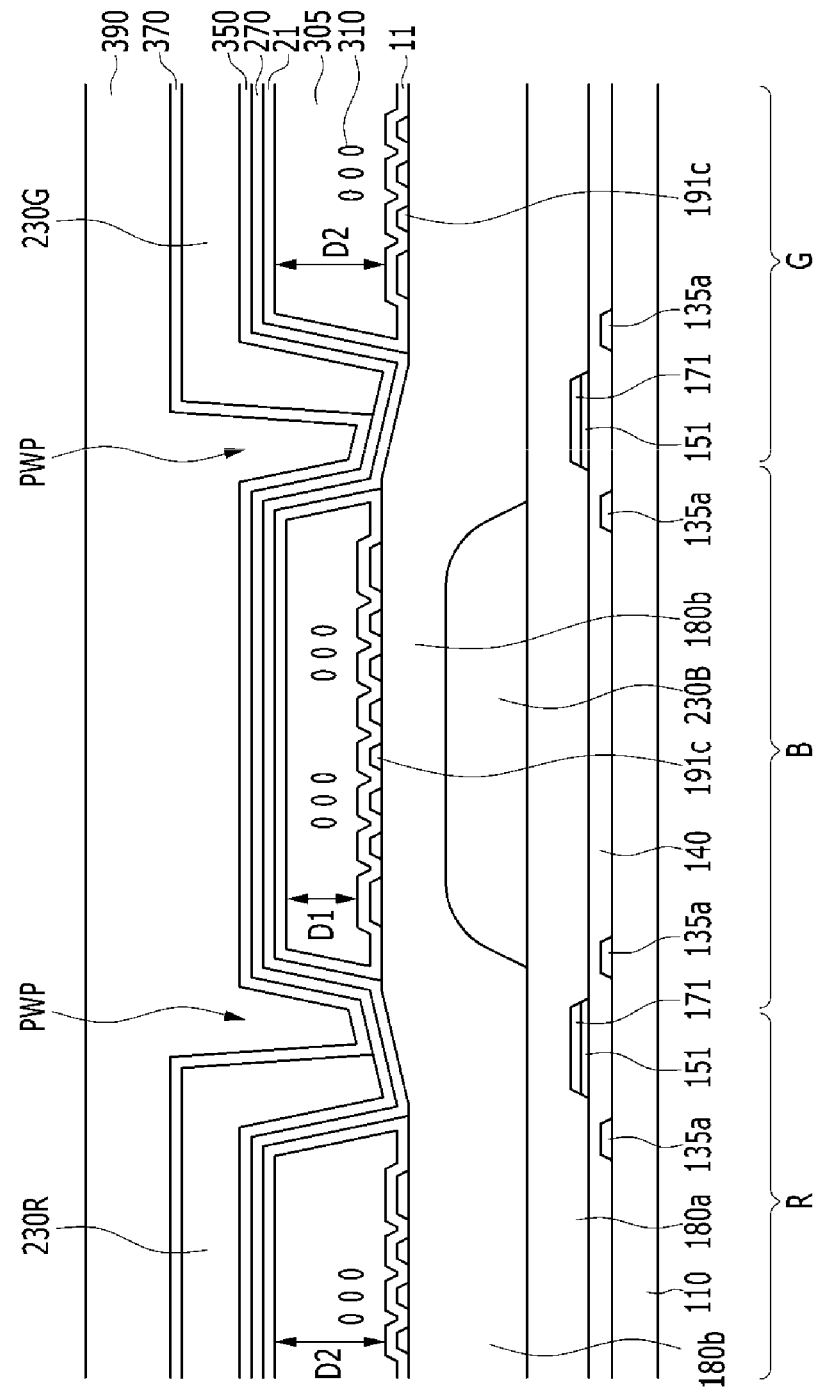
Figure 13:
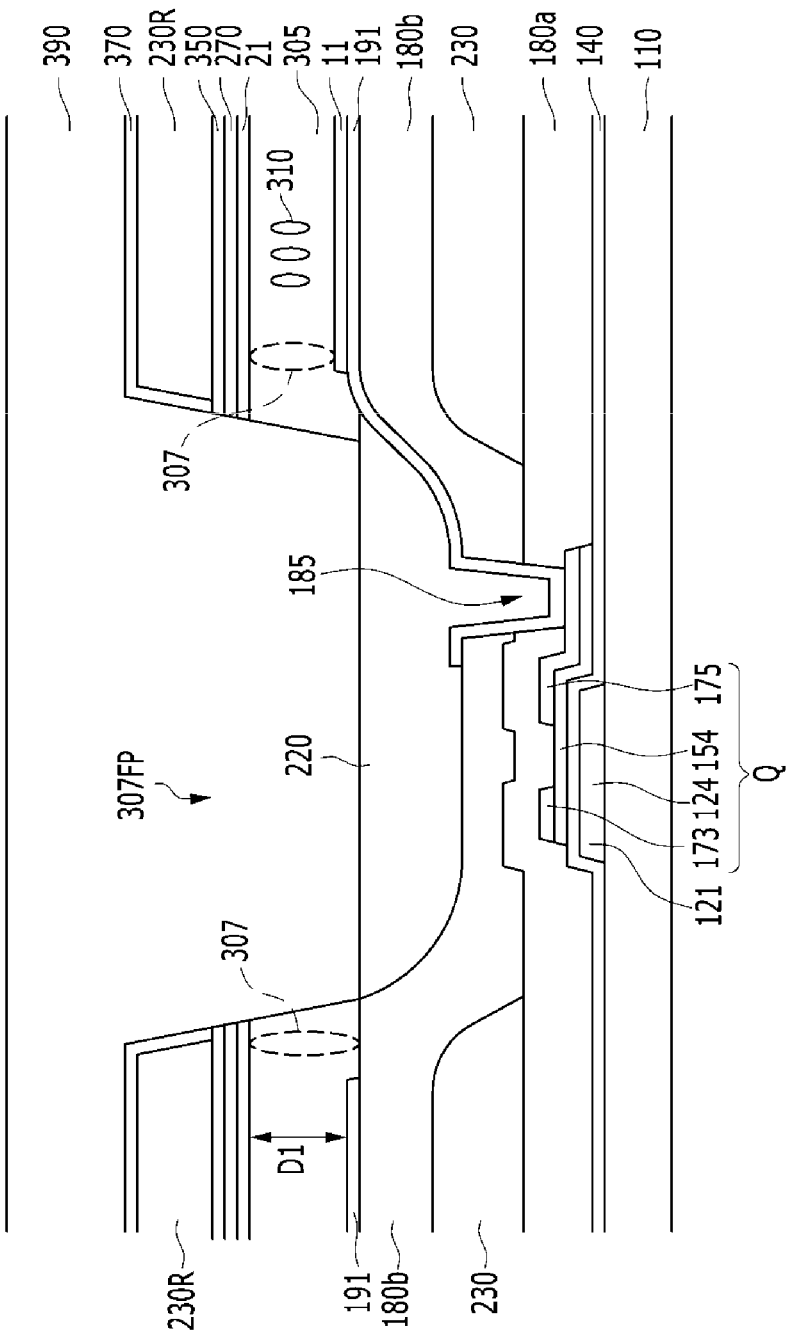

FIGS. 5 to 13 are process cross-sectional views illustrating a process of manufacturing a display device according to another exemplary embodiment of the present invention. FIGS. 5 to 10 and 12 illustrate the same cross section as FIG. 4, and FIGS. 11 and 13 illustrate the same cross section as FIG. 2.

First, in order to form a generally known switching element on the substrate 110, the gate line 121 extending in a horizontal direction, the gate insulating layer 140 on the gate line 121, the semiconductor layers 151 and 154 on the gate insulating layer 140, the source electrode 173, and the drain electrode 175 are formed. In this case, the data line 171 connected to the source electrode 173 may be formed to cross the gate line 121 and extend in a vertical direction.

The first interlayer insulating layer 180a is formed on the data conductors 171, 173, and 175 including the source electrode 173, the drain electrode 175, and the data line 171 and the exposed portion of the semiconductor layer 154.

Next, the blue color filter 230B is formed only in the blue pixel area. Then, the second interlayer insulating layer 180b is formed on the blue color filter 230B. In this case, the second interlayer insulating layer 180b is formed over all of the red pixel area and the green pixel area as well as the blue pixel area.

The second interlayer insulating layer 180b has a contact hole 185 which electrically and physically connects the pixel electrode 191 to the drain electrode 175.

Next, the pixel electrode 191 is formed on the second interlayer insulating layer 180b.

Subsequently, although not illustrated in FIG. 5, the light blocking member 220 is formed on a part of the pixel electrode 191 and the second interlayer insulating layer 180b. The light blocking member is formed in a horizontal direction parallel to the gate line 121. Alternatively, the light blocking member may further include a vertical light blocking member formed parallel with the data line 171 if desired.

Figure 5:
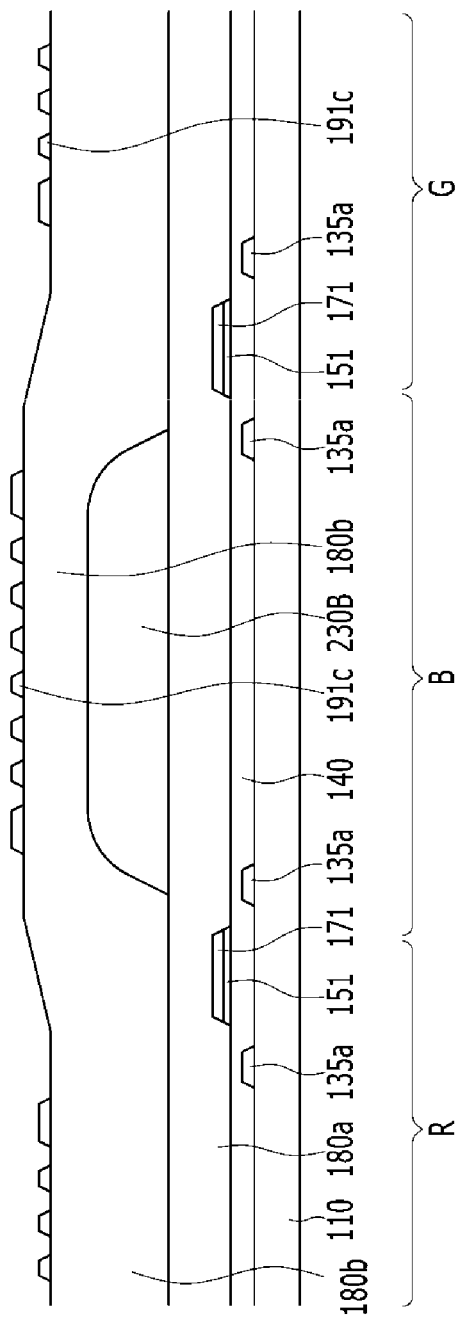
FIGS. 5 to 13 are cross-sectional views illustrating a process of manufacturing a display device according to an exemplary embodiment of the present invention.

Referring to FIG. 5, in the blue pixel area, since the blue color filter 230B is formed, a thickness from a lower portion of the substrate to the pixel electrode is increased as compared with other areas.

Figure 6:
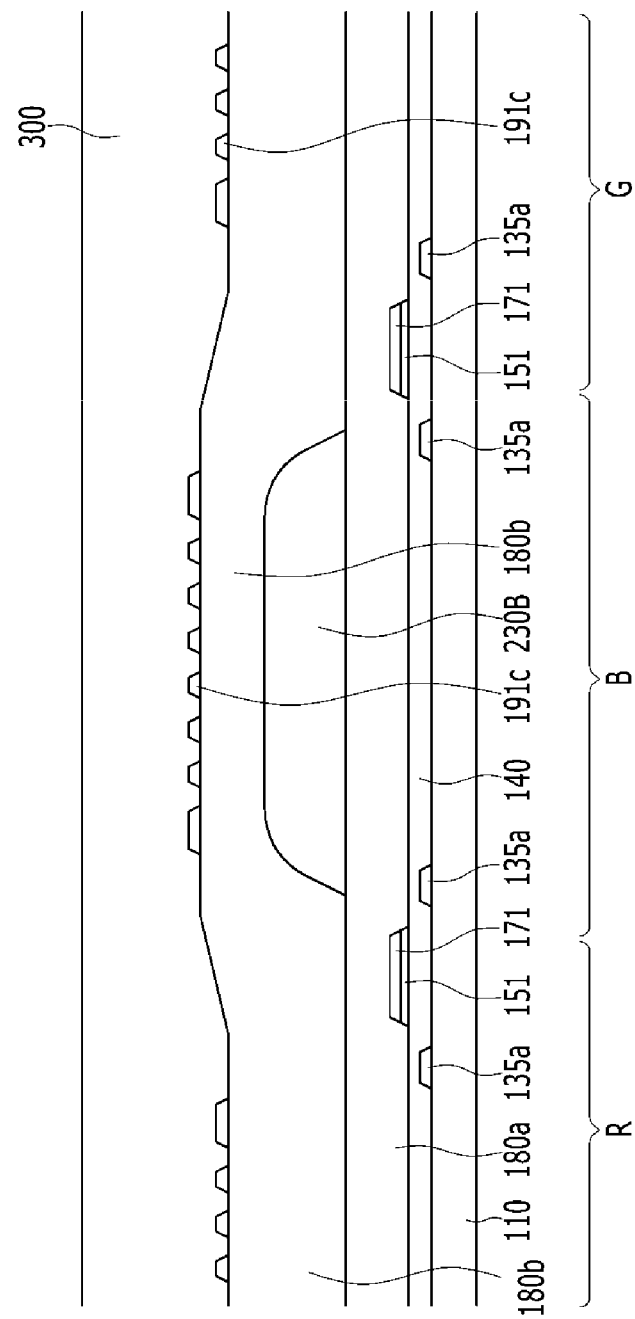

Next, as illustrated in FIG. 6, the sacrificial layer 300 is formed on the pixel electrode 191.

In this case, as illustrated in FIG. 6, the sacrificial layer 300 is formed to have a flat upper portion in spite of a lower step. That is, despite the protrusion in the second interlayer insulating layer 180b caused by the presence of the blue color filter 230b, the upper surface of the sacrificial layer is substantially flat. Since an upper portion is naturally flattened in a coating process of the sacrificial layer 300 material, a separate mask process or planarizing process is not required.

Since the sacrificial layer 300 is formed to have a flat upper surface as illustrated in FIG. 6, thicknesses of the sacrificial layers 300 in respective pixel areas R, B, and G are different from each other. In the blue pixel area, the thickness of the sacrificial layer 300 is smallest and the thicknesses of the sacrificial layers 300 in the red pixel and the green pixel are larger than the thickness of the sacrificial layer 300 in the blue pixel. The cell gap of the microcavities 305 thus varies due to the differing thicknesses of different portions of the sacrificial layers 300.

Figure 7:
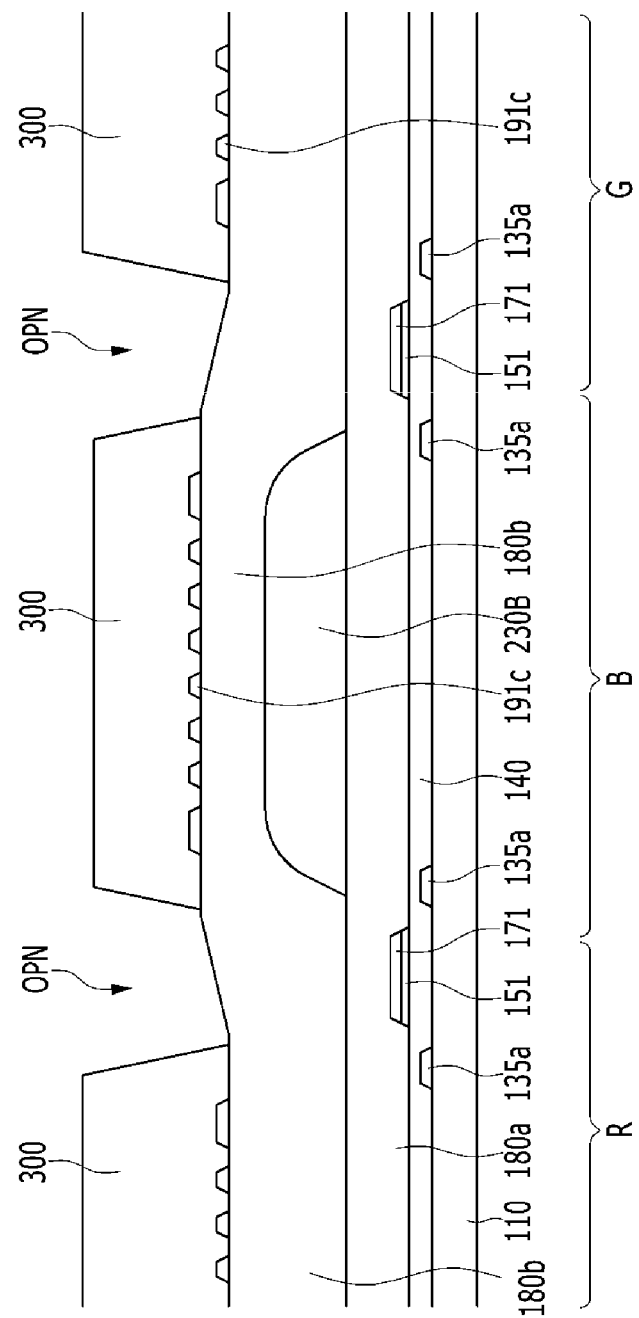

Next, as illustrated in FIG. 7, an open portion OPN extending parallel with the data line 171 is formed by patterning the sacrificial layers 300. In a subsequent process, the common electrode 270, the lower insulating layer 350, the color filter layers 230R and 230G, and the upper insulating layer 370 are filled in the open portion OPN to form the partition wall portion PWP.

Figure 8:
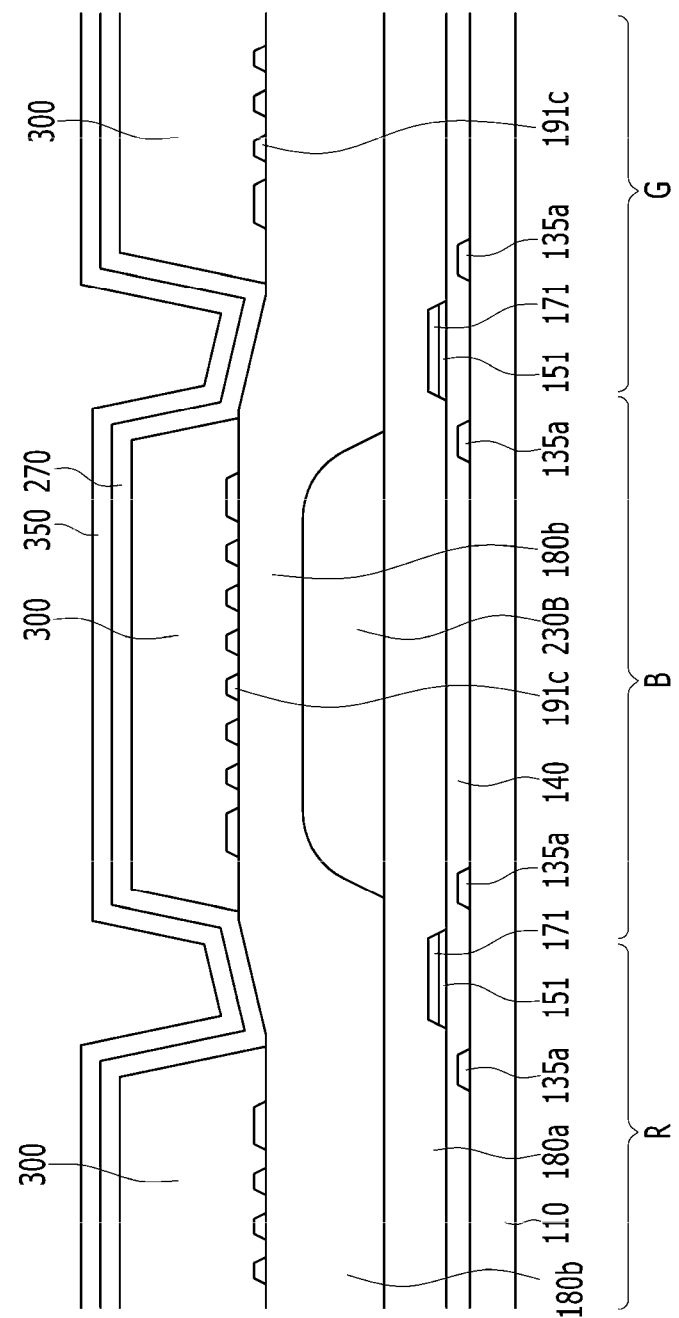

Next, as illustrated in FIG. 8, the common electrode 270 and the lower insulating layer 350 are sequentially formed on the sacrificial layers 300.

Next, as illustrated in FIG. 9, a color filter layer is formed on the lower insulating layer 350. In this case, the red color filter 230R is formed on the red pixel area, and the green color filter 230G is formed on the green pixel area.

The color filter layer 230 is removed in the trench 307FP.

That is, the color filter layer 230 may expose the lower insulating layer 350 within the trench 307FP.

However, the color filter layer 230 configures a partition wall PWP together with the common electrode 270 and the lower insulating layer 350.

Next, as illustrated in FIG. 10, the upper insulating layer 370 is formed to cover the color filter layer 230 and the exposed lower insulating layer 350. In this case, on the red pixel and the green pixel, the color filter layer serves as the roof layer, but on the blue pixel, the lower insulating layer 350 and the upper insulating layer 370 serve as the roof layer.

Accordingly, a sum of thicknesses of the lower insulating layer 350 and the upper insulating layer 370 may be 6,000 A or more, so that the lower insulating layer 350 and the upper insulating layer 370 in the blue pixel area serve as the roof layer.

Next, for convenience of description, a position of a cross section is described. Referring to FIG. 11, the upper insulating layer 370, the lower insulating layer 350, and the common electrode 270 are partially removed by dry-etching the upper insulating layer 370, the lower insulating layer 350, and the common electrode 270 to form the trench 307FP. In this case, the upper insulating layer 370 may have a structure covering the side of the color filter layer 230R, but is not limited thereto, and the upper insulating layer 370 covering the side of the color filter layer 230R may instead be removed to expose the side of the color filter layer 230R.

Next, the sacrificial layer 300 is removed by an oxygen $O_2$ ashing process or a wet etching method through the trench 307FP. In this case, the microcavity 305 having the inlet 307 is formed. The microcavity 305 is an empty space formed when the sacrificial layer 300 is removed.

In this case, widths of the microcavities 305 are different from each other in the blue pixel area, the green pixel area, and the red pixel area. This is because the area where the sacrificial layer 300 is removed becomes the microcavity 305. That is, in the previous process, the thickness of the sacrificial layers 300 is different for different pixel areas, and as a result, the thickness of the microcavity 305 varies for different pixel areas.

In short, through a process in which the blue color filter 230B is first formed below the microcavity, the thickness of the sacrificial layers 300 is differently formed without a separate mask process. That is, the thickness of the microcavity 305 may be differently formed without adding a separate mask for inducing the thickness difference of the sacrificial layer.

Next, the alignment layers 11 and 21 are formed on the pixel electrode 191 and the common electrode 270 by injecting the alignment material through the inlet 307. In detail, a bake process is performed after injecting solid aligning material dissolved in a solvent through the inlet 307.

Next, a liquid crystal material including the liquid crystal molecules 310 is injected into the microcavity 305 through the inlet 307 by using an inkjet method or the like.

Thereafter, referring to FIGS. 12 and 13, the capping layer 390 is formed on the upper insulating layer 370 to cover the inlet 307 and the trench 307FP.

As such, in the display device and its method of manufacture according to exemplary embodiments of the present invention, the blue color filter is formed below the microcavity, and the red color filter and the green color filter are formed on the microcavity to serve as a roof layer.

Accordingly, the cell gap of the microcavity of the blue pixel is lower than the cell gap of the microcavity of the red pixel or the green pixel. Therefore, deterioration of the contrast ratio may be prevented due to the difference in transmittance of the color filter.

Further, since the red color filter and the green color filter serve as the roof layer, a process of forming a separate roof layer may be omitted.

Further, in order to lower the cell gap of the microcavity of the blue pixel, a separate mask process is not required, and the display device is manufactured by first forming the blue color filter below the microcavity to induce the thickness different of the sacrificial layer, thereby simplifying the manufacturing process.

Next, hereinafter, a display device according to another exemplary embodiment of the present invention will be described with reference to FIGS. 14 to 18.

FIGS. 14 to 18 simplify and illustrate the same cross section as FIG. 4 with respect to a display device according to another exemplary embodiment of the present invention. That is, FIGS. 14 to 18 illustrate a color filter 230 and a microcavity 305 of the display device in somewhat simplified form, according to another exemplary embodiment. Since other constituent elements are the same as those described above, a detailed description of these elements is omitted.

Figure 14:
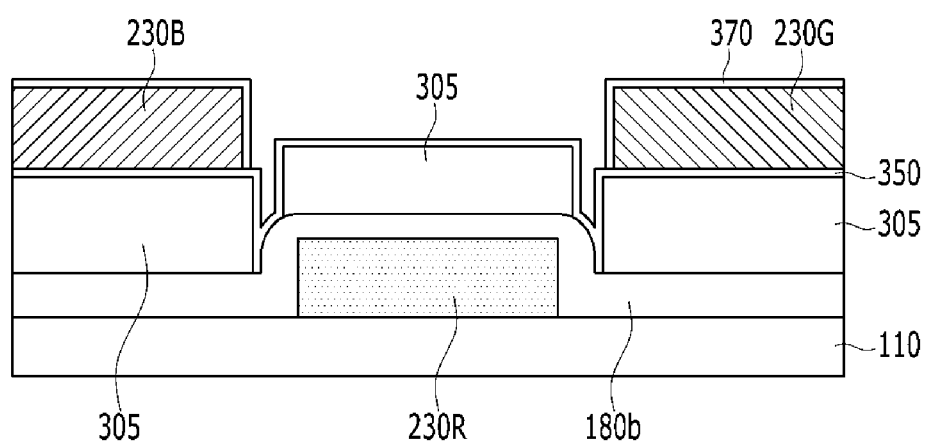
FIGS. 14 to 18 simplify and illustrate the same cross section as FIG. 4 with respect to a display device according to another exemplary embodiment of the present invention.
Figure 15:
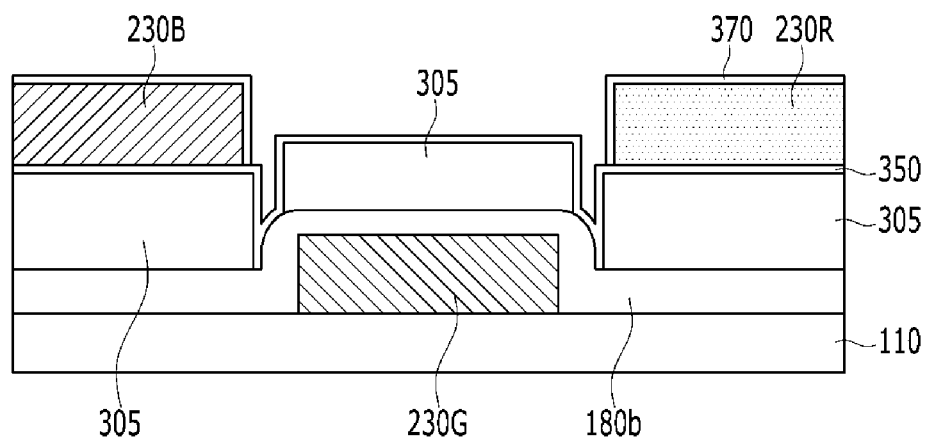

Referring to FIGS. 14 and 15, in the display device according to another exemplary embodiment of the present invention, other color filters besides a blue color filter may be positioned below the microcavity 305. Referring to FIG. 14, a red color filter 230R is positioned below the microcavity 305, and a blue color filter 230B and a green color filter 230G may be positioned on the microcavities 305.

Alternatively, as illustrated in FIG. 15, the green color filter 230G is positioned below the microcavity 305, and the blue color filter 230B and the red color filter 230R may be positioned on the microcavities 305.

Figure 16:
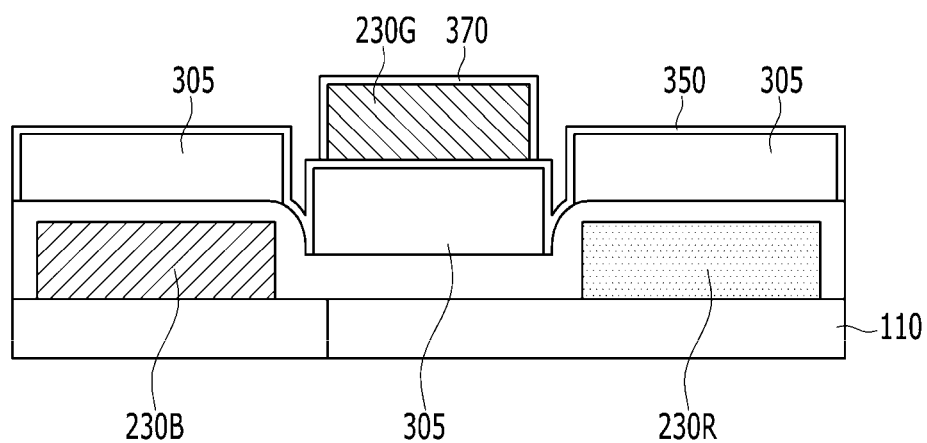
Figure 17:
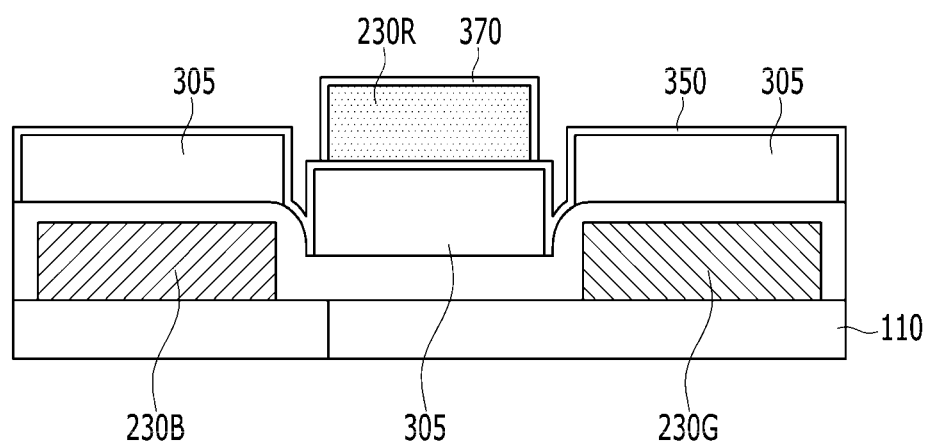
Figure 18:
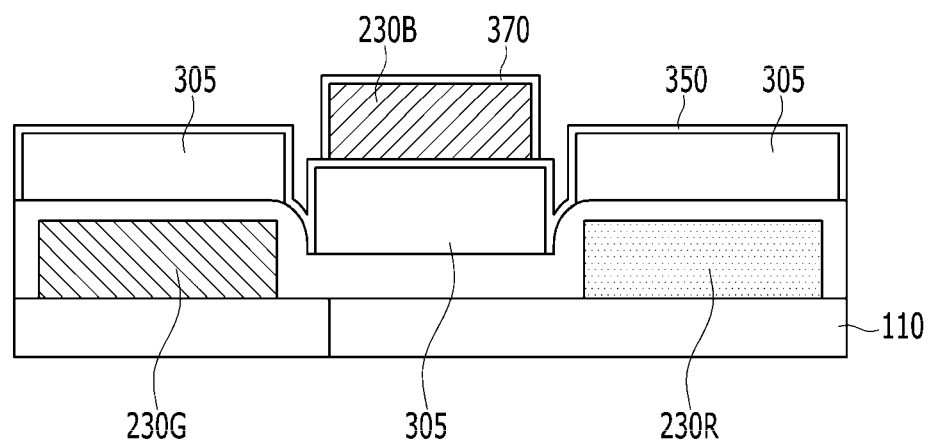

Alternatively, as illustrated in FIGS. 16 to 18, two color filters may be positioned below the microcavity 305.

That is, as illustrated in FIG. 16, the blue color filter 230B and the red color filter 230R are positioned below two microcavities 305, and the green color filter 230G may be positioned on the microcavity 305.

Alternatively, as illustrated in FIG. 17, the blue color filter 230B and the green color filter 230G are positioned below two microcavities 305, and the red color filter 230R may be positioned on the microcavity 305.

Alternatively, as illustrated in FIG. 18, the red color filter 230R and the green color filter 230G are positioned below two microcavities 305, and the blue color filter 230B may be positioned on the microcavity 305.

That is, according to a transmittance characteristic of the material used as each color filter, the positions of the color filters may be interchanged as desired and as illustrated in FIGS. 14 to 18. Also, the width of the microcavity corresponding to each color filter may be altered as desired.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

<Description of symbols>

| | |
|---|---|
| 11, 21: Alignment layer | 110: Substrate |
| 121: Gate line | 124: Gate electrode |
| 131: Storage electrode line | 140: Gate insulating layer |
| 151; Semiconductor layer | 171: Data line |
| 185: Contact hole | 180a: First interlayer insulating layer |
| 180b: Second interlayer insulating layer | 191: Pixel electrode |
| 220: Light blocking member | 230: Color filter |
| 270: Common electrode | 300: Sacrificial layer |
| 307: Inlet | 310: Liquid crystal molecule |
| 350: Lower insulating layer | 370: Upper insulating layer |
| 390: Capping layer | |

What is claimed is:

1. A display device, comprising:
a substrate including a first pixel area, a second pixel area, and a third pixel area;
a plurality of pixel electrodes positioned on the substrate within each of the first, second, and third pixel areas;
a plurality of roof layers each facing a respective one of the pixel electrodes, ones of the roof layers positioned to be spaced apart from respective ones of the pixel electrodes with a plurality of microcavities therebetween, the microcavities positioned to correspond to each of the first, second, and third pixel areas; and
a liquid crystal layer having liquid crystal material positioned in the microcavities,
wherein the roof layer includes a first color filter layer and a second color filter layer positioned to correspond to the first pixel area and the second pixel area, and further includes a third color filter layer positioned below the liquid crystal layer, and
wherein a cell gap of the microcavity corresponding to the third pixel area is smaller than a cell gap of the microcavity corresponding to the first pixel area and a cell gap of the microcavity corresponding to the second pixel area.

2. The display device of claim 1, wherein:
the third pixel area is a blue pixel area, and the third color filter is a blue color filter.

3. The display device of claim 2, wherein:
the first pixel area is a red pixel area, and the first color filter is a red color filter, and
the second pixel area is a green pixel area, and the second color filter is a green color filter.

4. The display device of claim 1, further comprising:
a common electrode formed on one of the microcavities to face the corresponding pixel electrode.

5. The display device of claim 4, wherein:
a lower insulating layer and an upper insulating layer are formed on the common electrode in the third pixel area.

6. The display device of claim 1, wherein:
a partition wall portion is positioned between two adjacent microcavities, and
the partition wall portion includes the common electrode, the lower insulating layer, the first color filter or the third color filter, and the upper insulating layer.

7. The display device of claim 5, further comprising:
a capping layer formed on the first color filter layer, the second color filter layer, and the upper insulating layer, wherein a trench is formed between adjacent microcavities, and the capping layer covers the trench.

8. The display device of claim 7, wherein:
the trench extends substantially parallel to a gate line.

9. The display device of claim 1, wherein:
the third pixel area is a red pixel area, and the third color filter is a red color filter.

10. The display device of claim 1, wherein:
the third pixel area is a green pixel area, and the third color filter is a green color filter.

11. A display device, comprising:
a substrate including a first pixel area, a second pixel area, and a third pixel area;
a plurality of pixel electrodes positioned on the substrate within each of the first, second, and third pixel areas;
a plurality of roof layers each facing a respective one of the pixel electrodes, ones of the roof layers positioned to be spaced apart from respective ones of the pixel electrodes with a plurality of microcavities therebetween, the microcavities positioned to correspond to each of the first, second, and third pixel areas; and
a liquid crystal layer having liquid crystal material positioned in the microcavities,
wherein the roof layer includes a first color filter layer positioned at a portion corresponding to the first pixel area, and includes a second color filter layer and a third color filter layer positioned below the liquid crystal layer.

12. The display device of claim 1, wherein:
a cell gap of the microcavity corresponding to the second pixel area and a cell gap of the microcavity corresponding to the third pixel area are smaller than a cell gap of the microcavity corresponding to the first pixel area.

13. The display device of claim 11, wherein:
the first color filter, the second color filter, and the third color filter have colors respectively selected from red, blue, and green.

14. A method of manufacturing a display device, the method comprising:
forming a first color filter on a substrate;
forming a first pixel electrode on the first color filter, and forming second and third pixel electrodes on the substrate and spaced apart from the first color filter;
coating and patterning a sacrificial layer on each of the pixel electrodes;
forming a second color filter and a third color filter on the sacrificial layer and on the second and third pixel electrodes, respectively;
forming a plurality of microcavities with liquid crystal injection holes by removing the sacrificial layer, the plurality of microcavities including a first microcavity over the first color filter, and second and third microcavities under the second and third color filters, respectively;
injecting an alignment material into the plurality of microcavities; and
injecting a liquid crystal material into the plurality of microcavities,
wherein a cell gap of the first microcavity is smaller than a cell gap of the second microcavity and is smaller than a cell gap of the third microcavity.

15. The method of claim 14, wherein:
the first color filter is a blue color filter, the second color filter is a green color filter, and the third color filter is a red color filter.

16. The method of claim 14, further comprising:
forming a light blocking member between adjacent ones of the color filters.

17. The method of claim 14, further comprising:
after the forming a first color filter and before the forming a second color filter and a third color filter, forming an interlayer insulating layer on the first color filter,
wherein a height of the interlayer insulating layer over the first color filter is different from a height of portions of the interlayer insulating layer spaced apart from the first color filter.

18. The method of claim 14, wherein:
after the coating and patterning, a thickness of the sacrificial layer over the first color filter is smaller than a thickness of remaining parts of the sacrificial layer.

19. The method of claim 14, further comprising:
prior to the forming a second color filter and a third color filter, forming a common electrode and a lower insulating layer on the sacrificial layer.

20. The method of claim 14, further comprising:
forming a capping layer on the second color filter layer and third color filter layer to cover the corresponding liquid crystal injection holes.

* * * * *